(No Model.)
W. B. SWAN.
CHANGEABLE SPEED DEVICE FOR BICYCLES.
No. 502,916. Patented Aug. 8, 1893.
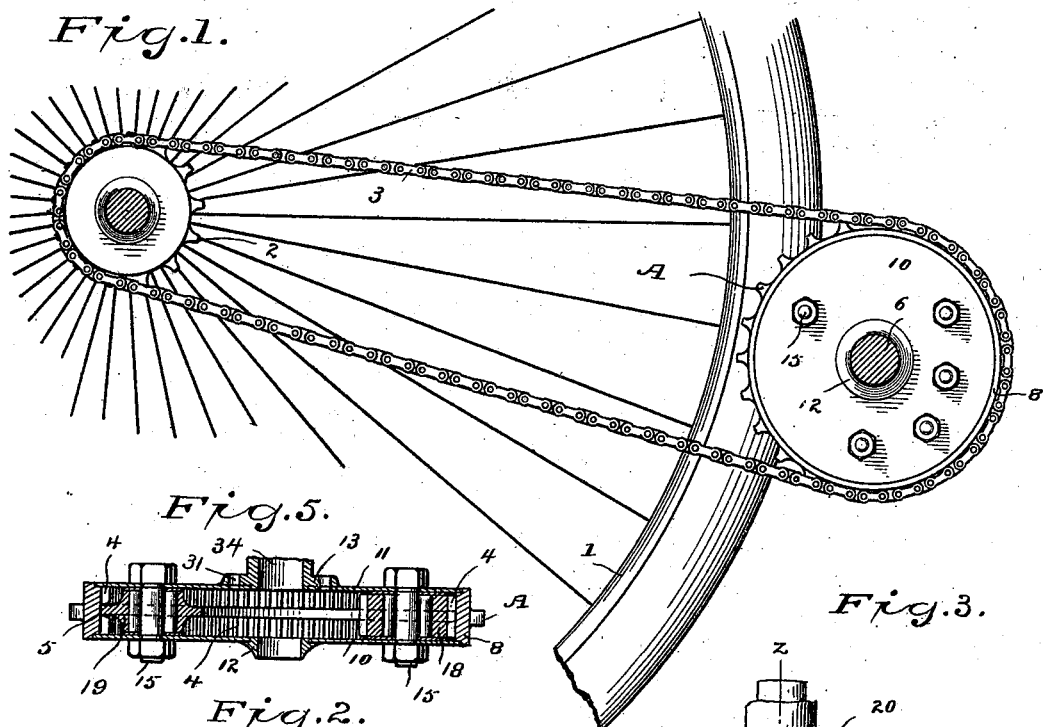
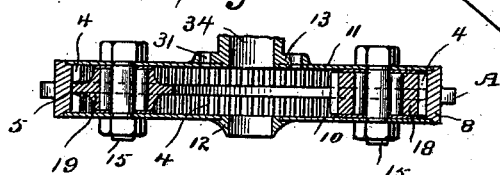
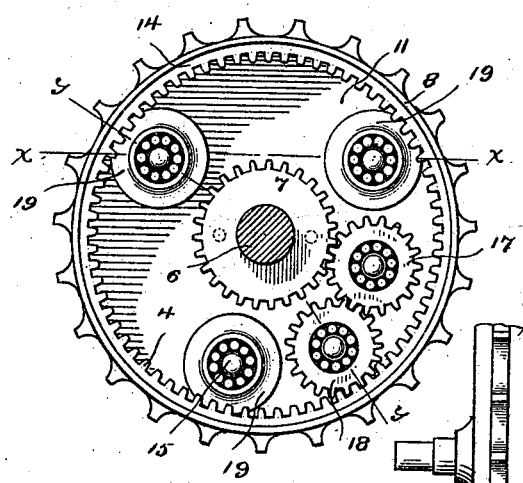
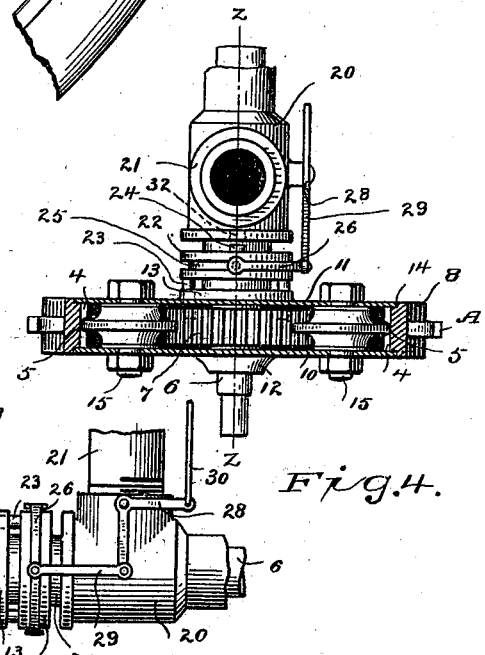
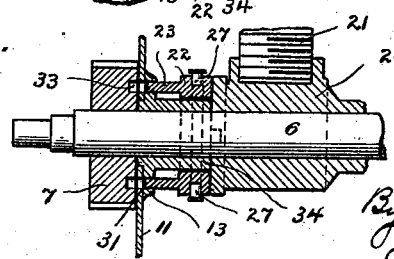
WITNESSES
H. A. Lantz
Mattie R. Davis
INVENTOR
William B. Swan
By A. M. Wooster
Atty.

UNITED STATES PATENT OFFICE.

WILLIAM B. SWAN, OF SEYMOUR, CONNECTICUT.

CHANGEABLE-SPEED DEVICE FOR BICYCLES.

SPECIFICATION forming part of Letters Patent No. 502,916, dated August 8, 1893.

Application filed June 8, 1892. Serial No. 435,942. (No model.)

*To all whom it may concern:*

Be it known that I, WILLIAM B. SWAN, a citizen of the United States, residing at Seymour, in the county of New Haven and State of Connecticut, have invented a certain new and useful Improved Changeable-Speed Device for Bicycles; and I do hereby declare the following to be a full, clear, and exact description of the invention, such as will enable others skilled in the art to which it appertains to make and use the same.

My invention has for its object to produce a device which may be readily attached to any safety bicycle driven by a chain, shall be simple and comparatively inexpensive to produce, easily operated from any convenient portion of the machine, and which while permitting the bicycle to be speeded to a normally higher rate than is practicable with machines as now driven will by a simple movement made without stopping the machine, permit the speed to be greatly decreased and the power to be relatively increased should the road be heavy or a grade be encountered, or by a partial movement of the operating mechanism will leave the pedal shaft and driving sprocket disconnected so that the pedals may be held stationary while coasting.

With these ends in view I have devised the simple and novel changeable speed device which I will now describe referring by numbers to the accompanying drawings forming part of this specification in which—

Figure 1 is a partial side view of the rear wheel, chain and sprockets of a safety bicycle, the shafts being in section; Fig. 2 a view of the driving sprocket, one of the side plates being removed disclosing the internal mechanism; Fig. 3 a section on the line *x x* in Fig. 2 looking down, the anti-friction rollers being in plan and the sliding collar at the intermediate position; Fig. 4 an elevation corresponding with Fig. 3, the view being from the right in said figure; Fig. 5 a section on the line *y y* in Fig. 2, and Fig. 6 is a section on the line *z z* in Fig. 3, the sliding collar being at the position to produce the slow speed.

1 denotes the rear wheel of a bicycle, A the driving sprocket, 2 the driven sprocket, and 3 the chain.

6 denotes the pedal shaft which carries a pinion 7. The driving sprocket consists of outer rim 8 having internal gear teeth 4 and side plates 10 and 11, said side plates 10 having a hub 12 and side plate 11 having a hub 13. These side plates rest in circular depressions 14 in the sides of the rim and are held together and to the rim by bolts 15. The hubs of the side plates are not connected to the shaft and are adapted to turn freely thereon. The internal gear teeth are preferably divided into two sections by a circular groove 5 having a smooth bottom.

17 denotes an intermediate pinion engaging pinion 7, and 18 denotes an intermediate pinion engaging pinion 17 and internal gear teeth 4. These pinions are preferably provided with roller bearings as shown in the drawings.

19 denotes anti-friction rollers the peripheries of which engage the bottom of groove 5. These rollers as well as pinions 17 and 18 are journaled on bolts 15. The anti-friction rollers support and carry the rim of the driving sprocket thereby preventing strain on the side plates and also preventing friction of hubs 12 and 13 on the pedal shaft.

20 denotes a sleeve in which the pedal shaft is journaled, and 21 the usual diagonal brace.

22 is a collar adapted to slide longitudinally on the pedal shaft or on a sleeve 34, forming part of hub 13, as shown in the drawings, which is provided on one side with lugs 23 adapted to engage correspondingly shaped openings 31 in hub 13 and on the opposite side preferably at right angles thereto with lugs 24 adapted to engage correspondingly shaped openings 32 in the side of sleeve 20.

33, see Fig. 6, denotes openings in pinion 7 adapted to receive lugs 23 when openings 31 are in line therewith, the openings in the sleeve and pinion 7 which are engaged by these lugs being also clearly shown by dotted lines in Figs. 3 and 4. Collar 22 is provided with a circular groove 25.

26 is a yoke having pins 27 engaging said groove.

28 is a bell crank lever pivoted to sleeve 20, and 29 is a link one end of which is pivoted to said bell crank lever, and the other to yoke 26.

30 is a rod extending from the outer arm of the bell crank lever along the diagonal brace to the handle bar, not shown, or to any portion of the machine convenient for manipulation. In practice I operate collar 22 in substantially the same manner that a bicycle brake is usually operated.

Another important advantage of my novel construction is that it enables me to hold the pedals stationary when the machine is coasting. In order to coast collar 22 is placed at an intermediate position as in Figs. 3 and 4. This leaves lugs 24 disengaged from sleeve 20 and lugs 23 disengaged from openings 33 in pinion 7 but engaged with openings 31 in hub 13. The result is that if the rider holds the pedal shaft stationary pinion 7 is likewise held stationary and the driving sprocket and intermediate gears will rotate about it, being carried by the chain.

The operation is as follows: Suppose that it is desired to use a bicycle for ordinary riding, that is to say upon a fairly good road and upon a level or a moderate grade. Rod 30 is pushed down by the operator, forcing collar 22 toward the left as seen in Fig. 4 and forcing lugs 23 through openings 31 in hub 13 and into openings 33 in pinion 7. This movement instantly locks the driving sprocket to pinion 7, the collar turning with the sprocket and pinion so that the machine will operate precisely as if an ordinary driving sprocket was used, the special internal mechanism in the driving sprocket being wholly out of use. Suppose now that the road is heavy or that a steep grade is met with; the operator by drawing up rod 30 will force collar 22 toward the right from the position shown in Fig. 4 to the position shown in Fig. 6. This operation places lugs 24 in engagement with openings 32 in sleeve 20 and locks collar 22 to the sleeve. It also locks the side plates to sleeve 20, said side plates being secured together by bolts 15, and the side plate having hub 13 remaining locked to the collar for the reason that lugs 23 never leave openings 31, as clearly shown in Fig. 6, the movement toward the right merely disengaging lugs 23 from openings 33 in pinion 7 but not disengaging them from openings 31 in hub 13. In this position of the parts motion is communicated to the driving sprocket by means of pinion 7 and intermediate pinions 17 and 18, the latter of which engages the internal gear teeth of the driving sprocket.

In practice I contemplate speeding bicycles so that the normal speed shall be as high as sixty or even seventy. By that I mean that a single rotation of the pedal shaft will carry the machine forward a distance equal to the forward movement of a wheel seventy inches in diameter during one revolution. Suppose for example, that the internal gear teeth 4 of the driving sprocket were seventy-two in number and the teeth in pinion 7, eighteen in number. It is obvious that it would require four complete revolutions of the pedal shaft and pinion 7 to produce one revolution of the driving sprocket, and that the power to drive the machine forward would be increased in proportion to the diminution of speed. I merely suggest these numbers for convenience in illustration, it being obvious that the speed of the machine, and the relative number of teeth in pinion 7 and on the driving sprocket are matters to be left entirely to the judgment of the manufacturer based upon the requirements of the trade, my object being to produce a device which may be readily attached to any bicycle, which will enable the normal speed of the machine to be greatly increased, for the reason that when heavy roads or steep grades are encountered the speed of the machine may, by a simple movement and without dismounting be changed so as to give greatly increased power accompanied by corresponding reduction of speed.

Having thus described my invention, I claim—

The combination with the pedal shaft having pinion 7, of a driving sprocket adapted to turn independently of the shaft and having internal gear teeth, divided into sections by a circular groove, an intermediate pinion a second intermediate pinion engaging the first intermediate pinion and pinion 7, suitable means for connecting or disconnecting the driving sprocket to pinion 7 for the purpose set forth, and anti-friction rollers within the sprocket engaging the circular groove.

In testimony whereof I affix my signature in presence of two witnesses.

WILLIAM B. SWAN.

Witnesses:
WILLIAM B. NICHOLS,
F. G. WEBSTER.